(12) United States Patent
Racklyeft et al.

(10) Patent No.: US 10,680,834 B2
(45) Date of Patent: Jun. 9, 2020

(54) SECURITY CREDENTIAL PROGRAMMING SYSTEM FOR PROGRAMMING SECURITY PROCESSOR CHIPS OF VEHICLE CONTROL MODULES

(71) Applicant: GM Global Technology Operations LLC, Detroit, MI (US)

(72) Inventors: David W. Racklyeft, Troy, MI (US); Jessica S. Moreno, Seoul (KR); Jian Shen, Cedar Park, TX (US); Leonard J. Leshinsky, Jr., Oxford, MI (US); Yoni Kahana, Kfar Hess (IL); Monica E. Mitchell, Royal Oak, MI (US); Hariharan Krishnan, Troy, MI (US); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 343 days.

(21) Appl. No.: 15/884,498

(22) Filed: Jan. 31, 2018

(65) Prior Publication Data
US 2019/0238343 A1    Aug. 1, 2019

(51) Int. Cl.
*H04L 29/06* (2006.01)
*G06F 21/00* (2013.01)
(Continued)

(52) U.S. Cl.
CPC .......... *H04L 9/3268* (2013.01); *H04L 9/0825* (2013.01); *H04L 9/14* (2013.01);
(Continued)

(58) Field of Classification Search
CPC ..... H04L 9/3268; H04L 9/3263; H04L 63/06; H04L 63/0442; H04L 9/14; H04L 9/0825;
(Continued)

(56) References Cited

U.S. PATENT DOCUMENTS

| | | | |
|---|---|---|---|
| 2009/0235071 A1* | 9/2009 | Bellur | H04L 9/3268 713/158 |
| 2011/0191581 A1* | 8/2011 | Shim | H04L 67/12 713/158 |

(Continued)

OTHER PUBLICATIONS

US Department of Transportation, "Vehicle-to-Vehicle Communications: Readiness of V2V Technology for Application", Aug. 2014, pp. 1-327.*

*Primary Examiner* — Lisa C Lewis

(57) ABSTRACT

A supplier network device is provided and includes a supplier processor and memory that stores a credential package including information for a chip or a vehicle control module (VCM). The supplier processor: receives ID and signature public keys from the chip, where the ID and signature public keys correspond respectively to private keys stored in the chip; transmit the ID and signature public keys to a certificate authority processor of a vehicle manufacturer data center; and receive the credential package including signing certificates from the certificate authority processor prior to assembling the VCM. The supplier processor: reads the ID public key from the VCM subsequent to incorporating the chip in the VCM; identifies the credential package based on the ID public key; and based on the identifying of the credential package, programs the VCM with the signing certificates prior to installation of the vehicle control module in a vehicle.

17 Claims, 5 Drawing Sheets

(51) Int. Cl.
*H04L 9/32* (2006.01)
*H04W 12/04* (2009.01)
*H04W 12/06* (2009.01)
*H04L 9/08* (2006.01)
*H04L 9/14* (2006.01)
*H04W 12/00* (2009.01)
*H04W 4/40* (2018.01)
*H04W 4/46* (2018.01)

(52) U.S. Cl.
CPC ........ *H04L 9/3263* (2013.01); *H04L 63/0442* (2013.01); *H04L 63/06* (2013.01); *H04W 12/04031* (2019.01); *H04W 12/0609* (2019.01); *H04L 9/0861* (2013.01); *H04L 63/062* (2013.01); *H04L 63/0823* (2013.01); *H04L 2209/80* (2013.01); *H04L 2209/84* (2013.01); *H04W 4/40* (2018.02); *H04W 4/46* (2018.02); *H04W 12/004* (2019.01); *H04W 12/04* (2013.01)

(58) Field of Classification Search
CPC ............... H04L 63/062; H04L 63/0823; H04L 2209/84; H04L 2209/80; H04L 9/0861; H04L 9/0897; H04L 9/3247; H04W 12/0609; H04W 12/04031; H04W 4/40; H04W 12/004; H04W 12/04; H04W 4/46
See application file for complete search history.

(56) References Cited

U.S. PATENT DOCUMENTS

| | | | |
|---|---|---|---|
| 2011/0238986 A1* | 9/2011 | Kherani | H04L 1/0041 713/168 |
| 2018/0004933 A1* | 1/2018 | Nathanson | H04W 12/06 |
| 2018/0137261 A1* | 5/2018 | Lattin | H04L 9/0827 |

* cited by examiner

SECURITY CREDENTIAL PROGRAMMING SYSTEM FOR PROGRAMMING SECURITY PROCESSOR CHIPS OF VEHICLE CONTROL MODULES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to manufacturing of vehicle control modules, and more particularly to provisioning vehicle control modules with security credentials.

A vehicle control module may include one or more security processor chips, memory, a transceiver, and/or other circuit components. A vehicle may include multiple vehicle control modules. Some vehicle control modules need security credentials in order to perform certain functions. As an example, a vehicle-to-vehicle (V2V) control module of a first vehicle communicates with other V2V control modules of other vehicles. In order to perform this communication, the V2V control module of the first vehicle needs to have public certificates signed with a root private key of a vehicle manufacturer in order to communicate with the other V2V control modules. The public certificates are needed in order to digitally sign messages being broadcast at a rate of, for example, 10 times per second. The messages are picked up by nearby vehicles and used to determine information associated with: the vehicle sending the messages; other nearby vehicles; and/or other nearby objects. The messages can include vehicle locations, vehicle speeds, vehicle headings, information regarding other nearby objects, indicators of whether vehicles are braking, etc.

According to V2V communication protocols, each of the messages, transmitted from a first V2V control module of a first vehicle to a second V2V control module of a second vehicle, needs to be signed using a private key that is unique to the first V2V control module. In addition, each of the messages needs to include a signed public certificate, which includes a public key of the first V2V control module. For privacy reasons, V2V communication protocols include using different public certificates for different messages, for example using 20 different certificates over the course of one week, replacing these with a new set of 20 different certificates the next week, and so on for the lifetime of the vehicle. In order for a new vehicle to operate uninterrupted for an extended period of time (e.g. 3 years) before needing another download of certificates, a large predetermined number of public certificates (e.g., 3000 public certificates) need to be created and stored in each of the V2V control modules. V2V communication protocols further require that, for each V2V control module, a package of the predetermined number of public certificates be created and encrypted. Encryption of the public certificates prevents unauthorized network devices from reading an entire set of public certificates of a vehicle and as a result obtaining information pertaining to one or more of the V2V control modules.

SUMMARY

A supplier network device is provided and includes a supplier processor and memory. The memory is configured to store instructions executable by the supplier processor and credential packages. One of the credential packages includes credential information for at least one of a first security processor chip or a corresponding vehicle control module to perform predetermined functions within a vehicle. The supplier processor is configured to execute the instructions to: receive an identifier (ID) public key and signature public keys from the first security processor chip, where the ID public key and the signature public keys correspond to respective private keys stored in the security processor chip; transmit the ID public key and the signature public keys to a certificate authority processor of a vehicle manufacturer data center; and receive the one of the credential packages from the certificate authority processor prior to assembly of the vehicle control module. The credential package includes signing certificates. The supplier processor is further configured to execute the instructions to: read the ID public key from the vehicle control module subsequent to incorporating the first security processor chip in the vehicle control module; identify the one of the credential packages based on the ID public key; and based on the identifying of the one of the credential packages, program the vehicle control module with the signing certificates prior to installation of the vehicle control module in the vehicle.

In other features, the supplier processor is configured to execute the instructions to: transmit an ID public key and signature public keys for each of multiple security processor chips; the security processor chips include the first security processor chip; and in response to transmitting the transmit ID public key and the signature public keys for each of the security processor chips, receive the credential packages from the certificate authority processor.

In other features, the supplier processor is configured to execute the instructions to: wait until a predetermined number of credential packages are received; and when the predetermined number of credential packages have been received from the certificate authority processor, programming multiple vehicle control modules.

In other features, the vehicle control modules are programmed to perform vehicle-to-vehicle communication functions.

In other features, the supplier processor does not receive the private keys from the first security processor chip.

In other features, the supplier processor is configured to execute the instructions to, subsequent to receiving the one of the credential packages from the certificate authority processor to the supplier processor, transmit a serial number of the vehicle control module and the ID public key from the supplier processor to the certificate authority processor.

In other features, a security credential programming system is provided and includes the supplier network device, the security processor chip and a key extraction interface. The security processor chip is configured to prevent external access to the private keys. The key extraction interface connects the supplier network device to the security processor chips.

In other features, the security processor chip is configured to, prior to being incorporated in the vehicle control module, (i) generate the ID public key and the signature public keys, and (ii) transmit the ID public key and the signature public keys to the supplier processor.

In other features, the security processor chip generates the private keys while generating the ID public key and the signature public keys. One of the private keys corresponds to the ID public key and the other ones of the private keys correspond respectively to the signature public keys.

In other features, the credential packages are encrypted based on the ID public key. The security processor chip is configured to, subsequent to being incorporated in the vehicle control module, decrypt the one of the credential packages based on a private key corresponding to the ID public key.

In other features, a certificate authority network device is provided and includes a certificate authority processor and memory. The memory is configured to store instructions executable by the certificate authority processor. The certificate authority processor is configured to execute the instructions to: receive an identifier (ID) public key and a signature public keys from a supplier processor of a control module supplier facility, where the ID public key and the signature public keys correspond to respective private keys stored in a first security processor chip; create certificates respectively for the plurality of signature public keys; and sign the certificates with a vehicle manufacturer root private key to provide signing certificates. The certificate authority processor is further configured to execute the instructions to: package the signing certificates into a file to create a first credential package, where the credential packages includes credential information for at least one of the first security processor chip or a corresponding vehicle control module to perform predetermined functions within a vehicle; and prior to the control module supplier facility manufacturing the vehicle control module including the first security processor chip, transmit the credential package from the certificate authority network device to the supplier processor for programming the security processor chip.

In other features, the certificate authority processor is configured to execute the instructions to encrypt the file including the signing certificates based on the ID public key to provide the credential package.

In other features, the certificate authority processor is configured to execute the instructions to: receive an ID public key and signature public keys from the supplier processor for security processor chips, where the security processor chips includes the first security processor chip; and for each of the security processor chips, create certificates respectively for the corresponding signature public keys, sign the corresponding ones of the certificates with the vehicle manufacturer root private key to provide multiple signing certificates, and package the corresponding signing certificates into a file to provide a respective one of multiple credential packages. The credential packages include the first credential package. The certificate authority processor is further configured to execute the instructions to prior to the control module supplier facility manufacturing vehicle control modules including the security processor chips, transmit the credential packages of the security processor chips from the certificate authority network device to the supplier processor for programming the security processor chips.

In other features, the certificate authority processor is configured to execute the instructions to (i) encrypt the files based respectively on the ID public keys to provide the credential packages, and (ii) transmit the credential packages to the supplier processor.

In other features, the certificate authority processor is configured to execute the instructions to (i) subsequent to transmitting the file from the certificate authority network device to the supplier processor, receive a serial number of the vehicle control module from the supplier processor; and (ii) store the serial number of the vehicle control module along with the ID public key.

In other features, a security credential programming system is provided and includes a first network device and a second network device. The first network device includes a first memory and a first processor. The first memory is configured to store credential packages, where the credential package includes credential information for a first security processor chip to perform predetermined functions within a vehicle. The first processor is configured to: receive an identifier (ID) public key and signature public keys from the first security processor chip, where the ID public key and the signature public keys correspond to respective private keys stored in the security processor chip; and transmit the ID public key and the signature public keys. The second network device includes a second memory and a second processor. The second processor is configured to: receive the ID public key and the signature public keys from the first processor; create certificates respectively for the signature public keys; sign the certificates with a vehicle manufacturer root private key to provide signing certificates; package the signing certificates and creating one of the credential packages; and prior to the manufacturing a vehicle control module including the first security processor chip, transmit the one of the credential packages from the second network device to the first processor for programming a first vehicle control module. The first processor is configured to: receive the one of the credential packages from the second processor prior to assembly of the first vehicle control module; read the ID public key from the first vehicle control module subsequent to incorporating the first security processor chip in the first vehicle control module; identify the one of the credential packages based on the ID public key; and based on the identifying of the one of the credential packages, program the first vehicle control module with the signing certificates prior to installation of the first vehicle control module in the vehicle.

In other features, the first processor is configured to: wait until a predetermined number of credential packages are received from the second processor; and when the predetermined number of credential packages have been received from the second processor, programming vehicle control modules including the first vehicle control module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
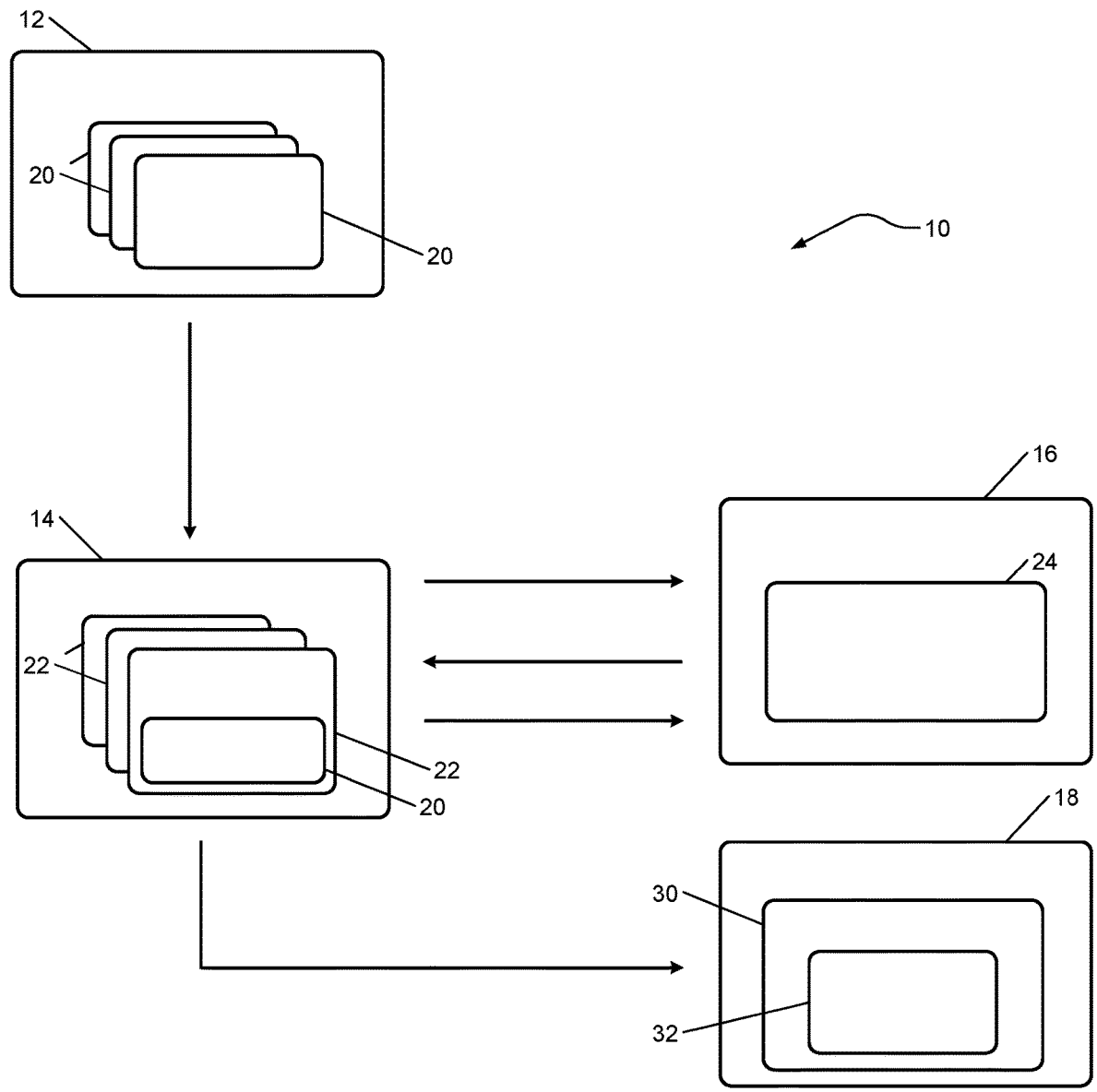
FIG. 1 is a functional block diagram of an example of a security credential programming system for programming security processor chips of vehicle control modules in accordance with an embodiment of the present disclosure.

During manufacturing of vehicles and/or corresponding vehicle control modules, public certificates may be created and stored on the vehicle control modules. The public certificates contain the information needed by other vehicles to verify the authenticity of messages signed by the vehicle control module, including a module public key corresponding to a module private key used to sign the messages, and a certificate signature created by a root private key of a vehicle manufacturer. During this process, the public certificates include respective public keys and are signed with a root private key of a security authority data center and/or information technology (IT) system of a vehicle manufacturer. A single vehicle may be designed to include one or more vehicle control modules for which public certificates are to be created. Millions of vehicle control modules, each of which storing thousands of public certificates, may be manufactured each year. The vehicle control modules may be manufactured by a control module supplier and shipped to a vehicle manufacturer, which may then install the vehicle control modules in vehicles. Creation and storing of the public certificates can be time consuming.

One technique that may be used to create and store public certificates in vehicle control modules includes a vehicle manufacturer data center creating private keys for the vehicle control modules. The vehicle manufacture data center has security authority to create and sign public certificates for the vehicle control modules. The signed public certificates include respective public keys. The vehicle manufacture data center may create, for example, 3000 private keys and 3000 signed public certificates for each vehicle control module. The private keys and the signed public certificate may be grouped into a package and sent from the vehicle manufacture data center to a control module supplier. The control module supplier may then download the private keys and the signed public certificates to the vehicle control modules, as the vehicle control modules are manufactured. This technique however risks exposure of the private keys and requires expensive computer and network controls to protect the private keys from exposure. The transmission of the private keys from the vehicle manufacture data center to the control module supplier is inherently insecure.

Another technique includes a control module supplier shipping, to a vehicle manufacturer, vehicle control modules that do not include any keys and public certificates. The vehicle manufacturer manufactures a vehicle and installs the vehicle control modules. At an end of a vehicle assembly line, the vehicle and the vehicle control modules are powered on and each of the vehicle control modules creates 3000 private/public key pairs. The vehicle control modules then read from memory the public keys and transmit the public keys to a vehicle manufacture data center. The vehicle manufacture data center then creates, signs and returns 3000 public certificates with the respective public keys to each of the vehicle control modules. The public certificates may be stored in memories of the vehicle control module subsequent to being received. This technique causes vehicle assembly process delays of, for example, several minutes per vehicle while the private keys and public certificates are being created, transmitted, and downloaded. In addition, any glitch in this process, such as during transmission of the private keys and public certificates via a computer network at the vehicle manufacture data center can further delay manufactured completion of a vehicle for hours or days.

Another technique includes a control module supplier performing a process to manufacture a vehicle control module without any previously generated and/or stored keys. Towards an end of the process, the vehicle control module is powered on and the vehicle control module: creates 3000 private/public key pairs; sends the public keys to a vehicle manufacturer data center; and receives back from the vehicle manufacturer data center 3000 public certificates with the respective public keys. Although this technique avoids vehicle assembly line delays, there are delays and associated risks of stoppages during manufacturing of the vehicle control modules. If, for example, a network connection between the control module supplier and the vehicle manufacturer data center is slow or unavailable, the manufacturing process of the control modules would be interrupted.

The problems associated with the above-described techniques are overcome by powering up the security processor chips before manufacturing the corresponding control modules. The examples set forth herein include, prior to being incorporated in a vehicle control module, powering on security processor chips, generating private/public key pairs, maintaining storage of the private keys in the security processor chips, and transmitting the public keys to a vehicle manufacturer data center. The private keys are not generated outside of the security processor chips and are not shared with any other device. As a result, only the security processor chips have access to the private keys.

The security processor chips may each generate a predetermined number (e.g., 3000) of private/public keys and transmit the public keys to an IT system of a control module supplier, which may then write the public keys in a supplier memory. The security processor chips are then inventoried while the IT system of the control module supplier sends the public keys to the vehicle manufacturer data center. The vehicle manufacturer data center creates, signs and packages public certificates and sends the public certificates back to the control module supplier. When the control module supplier has received a predetermined number of packages suitable for implementing a production run (e.g. 1000 packages for 1000 vehicle control modules), the control module supplier proceeds to manufacturing the control modules.

Although the following examples are primarily described with respect to manufacturing security processor chips and control modules of a vehicle, the examples are applicable to generation of other security processor chips and control modules for other products, network devices, systems, etc. The examples provide secure and efficient techniques for programming security processor chips of control modules prior to the control modules being incorporated into corresponding operating systems. This is accomplished without causing production line delays during manufacturing of the control modules and/or manufacturing of products in which the control modules are incorporated.

FIG. 1 shows a security credential programming system 10 for programming security processor chips of vehicle control modules. The security credential programming system 10 includes a security processor chip supplier facility 12, a control module supplier facility 14, a vehicle manufacturer data center 16, and a vehicle manufacturer plant 18. The security processor chip supplier facility 12 manufactures security processor chips 20 for vehicle control modules 22. The security processor chips 20 are integrated circuits, programmed by the security processor chip supplier facility 12 to perform certain predetermined functions. The security processor chips 20 are shipped from the security processor chip supplier facility 12 to a control module supplier facility 14.

The control module supplier facility 14 manufactures the vehicle control modules 22 to include the security processor chips 20. Each of the vehicle control modules 22 may include one or more of the security processor chips 20. Prior to manufacturing the vehicle control modules 22, the control module supplier facility 14 connects to and powers on the security processor chips 20. The security processor chips 20 are preprogrammed at the security processor chip supplier facility 12 to generate a predetermined number private/public key pairs when powered on. Subsequent to generating the private/public key pairs, the control module supplier facility 14 transmits the public keys to the vehicle manufacturer data center 16. Transmission of signals between the control module supplier facility and the vehicle manufacturer data center 16 may be over a wireless or wired computer network, such as a local area network (LAN) and/or a wide area network (WAN). A certificate authority network device 24 at the vehicle manufacturer data center 16 creates credential packages including signed public certificates. The signed public certificates include respectively the public keys. Each package may include a predetermined number of public certificates (e.g., 3000). The certificate authority network device 24 may be, for example, a server, a computer, or other network device. The credential packages are transmitted from the certificate authority network device 24 or other network device of the vehicle manufacturer data center 16 back to the control module supplier facility 14.

The control module supplier facility 14, after receiving a predetermined number of credential packages to perform a production run, manufactures the vehicle control modules 22 including: programming the security processor chips with the credential packages; and mounting the security processor chips, memory chips and/or other hardware to, for example, printed circuit boards. The security processor chips may be incorporated in system-in-packages (SIPs). In one embodiment, the vehicle control modules include one or more SIPs. In another embodiment, the vehicle control modules are implemented as SIPs. Each SIP may include one or more security processor chips.

After manufacturing the control modules, the control module supplier facility 14 may also provide, for record keeping and/or other purposes, serial numbers of the vehicle control modules 22 and IDs of the security processor chips to the certificate authority network device 24, so that the vehicle manufacturer knows which control modules received credential packages for which security processor chips.

The control module supplier facility 14 ships the manufactured vehicle control modules 22, which are fully-provisioned with the corresponding credential packages of certificates, to the vehicle manufacturer plant 18, which than incorporates the vehicle control modules 22 into vehicles (one vehicle 30 is shown including one vehicle control module 32). By fully programming the vehicle control modules with the signed public certificates, prior to being received at the vehicle manufacturer plant 18, there is not a risk of delaying manufacturing of the vehicles due to programming and manufacturing of the vehicle control modules.

Figure 2:
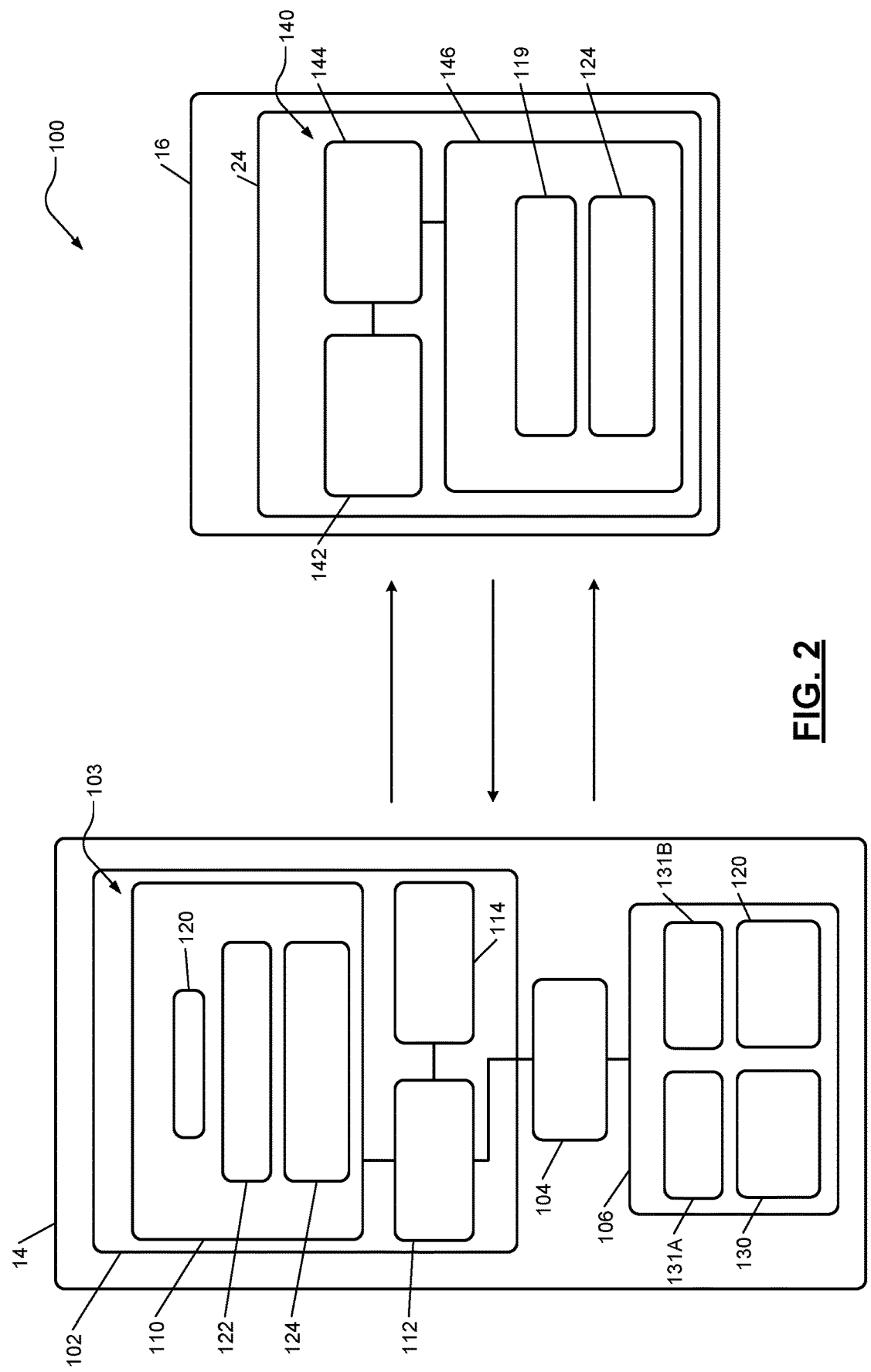
FIG. 2 is a functional block diagram of examples of a control module supplier facility and a vehicle manufacturer data center of the security credential programming system of FIG. 1.

FIG. 2 shows a portion 100 of the security credential programming system 10 of FIG. 1 including the control module supplier facility 14 and the vehicle manufacturer data center 16. The control module supplier facility 14 may include a supplier network device 102 and a key extraction interface 104, which may be used to extract the public keys from one or more security processor chips (one security processor chip 106) is shown. As an example, the key extraction interface 104 may include a mounting board and the security processor chips may be attached or plugged onto the mounting board. The key extraction interface 104 may include connectors for connecting to the one or more security processor chips. The supplier network device 102 may be a server, computer and/or other network device. The supplier network device 102 may include an IT system 103 having a supplier memory 110, a supplier processor 112, and a supplier transceiver 114.

The supplier memory 110 may store public signing keys 120, credential packages of certificates 122, and a table 124 of control module serial numbers and security processor public ID keys. The security processor chip 106 may store private signing keys 130, the ones of the public signing keys 120 corresponding to the private signing keys 130, and a security processor chip ID private/public key pair including an ID private key 131A and an ID public key 131B.

The vehicle manufacturer data center 16 includes the certificate authority network device 24, which includes an IT system 140. The IT system 140 includes a certificate authority transceiver 142, a certificate authority processor 144 and a certificate authority memory 146. The certificate authority memory 146 contains the vehicle manufacturer root private key 119 that is used to sign the security processor public certificates. It also contains the table of CM serial numbers and security processor ID public keys 124.

Operations of the supplier network device 102 and the certificate authority network device 24 are further described below with respect to the methods illustrated in FIGS. 4-5.

Figure 3:
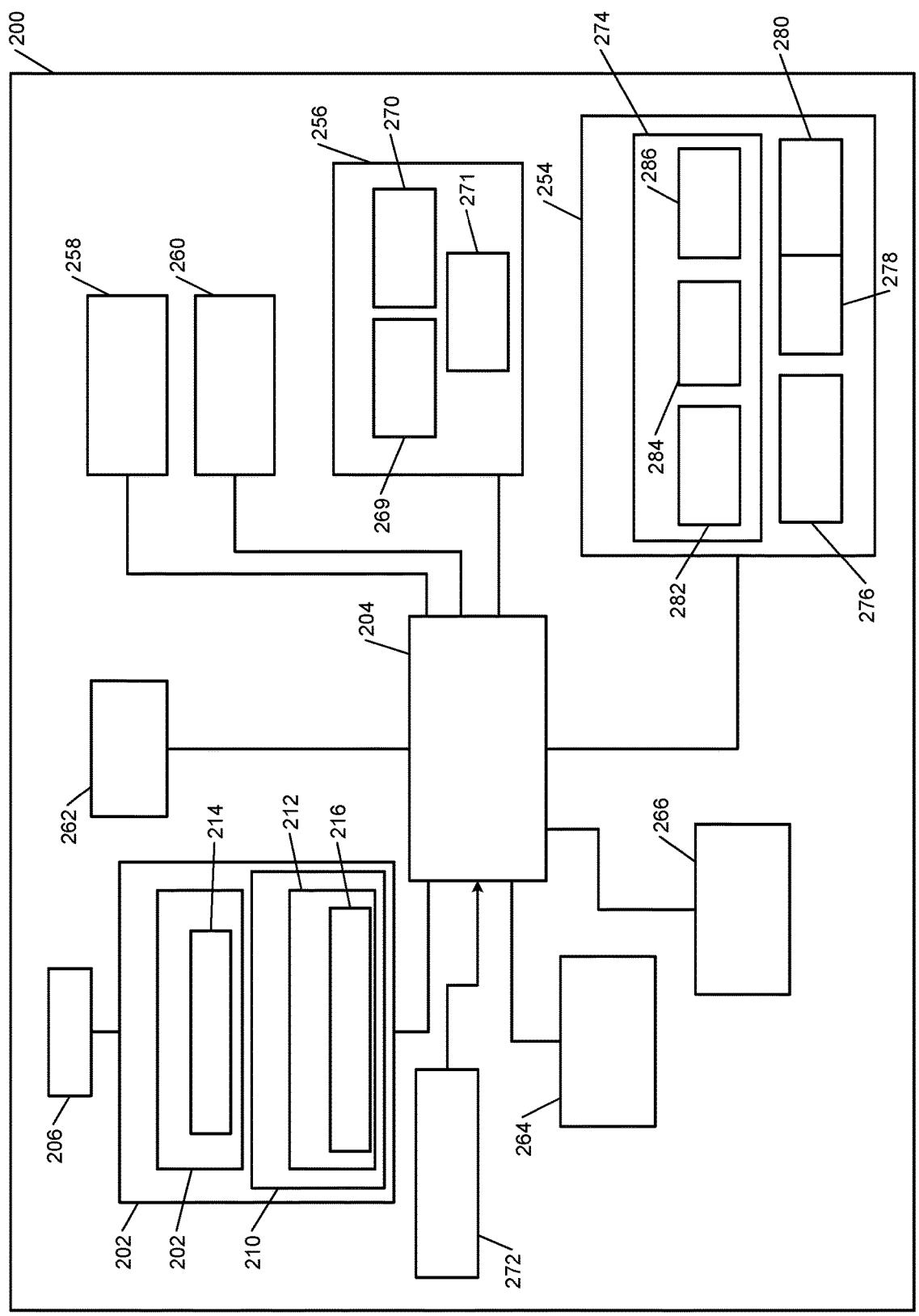
FIG. 3 is a functional block diagram of an example of a vehicle including vehicle control modules programmed in accordance with an embodiment of the present disclosure.

FIG. 3 shows a vehicle 200 including vehicle control modules, such as a V2V control module 202 and other vehicle control modules 204. Although the vehicle 200 is shown as having multiple vehicle control modules, the vehicle 200 may have a single vehicle control module. Also, although the V2V control module 202 is shown as being connected to a transceiver 206 and the vehicle control modules 204, the V2V control module 202 may be connected to one or more of the devices and systems to which the other vehicle control modules 204 are connected.

The V2V control module 202 performs vehicle-to-vehicle communication via the transceiver 206. The V2V control module 202 includes memory 203, which stores the credential package 214, which may be generated by the certificate authority network device 24 of FIGS. 1-2. The V2V control module 202 also includes a security processor chip 210, which has memory 212. The memory 212 stores private/public key pairs 216 generated by the security processor chip 210 prior to being installed on the V2V control module 202. The V2V control module 202 may generate alert signals to alert a driver of the vehicle 200. The alert signals may be provided via, for example, the infotainment system 262.

The other vehicle control modules 204 may control operations of various vehicle systems. The V2V control module 202 may transmit information received from the vehicle control modules 204 to other V2V control modules of other vehicles. The vehicle systems may include a propulsion system 254, an air-conditioning system 256, seat systems 258, lighting systems 260, infotainment system 262, navigation system 264, and/or other vehicle systems 266, such as a braking system, a communication system, etc. The vehicle control modules 202, 204 may execute applications and corresponding functions to control the vehicle systems. The vehicle systems may include actuators. For example, the air-conditioning system 256 may include one or more pump(s) 269, heaters 270, and fans 271. This control may be based on signals from sensors 272 and may include wireless communication via the transceiver 206 and/or other transceiver. The propulsion system 254 may include an engine 274, a transmission 276, one or more motors 278, and a power source (e.g., a battery system) 280. The engine 274 may include a throttle system 282, an ignition system 284, and a fuel system 286.

Figure 4:
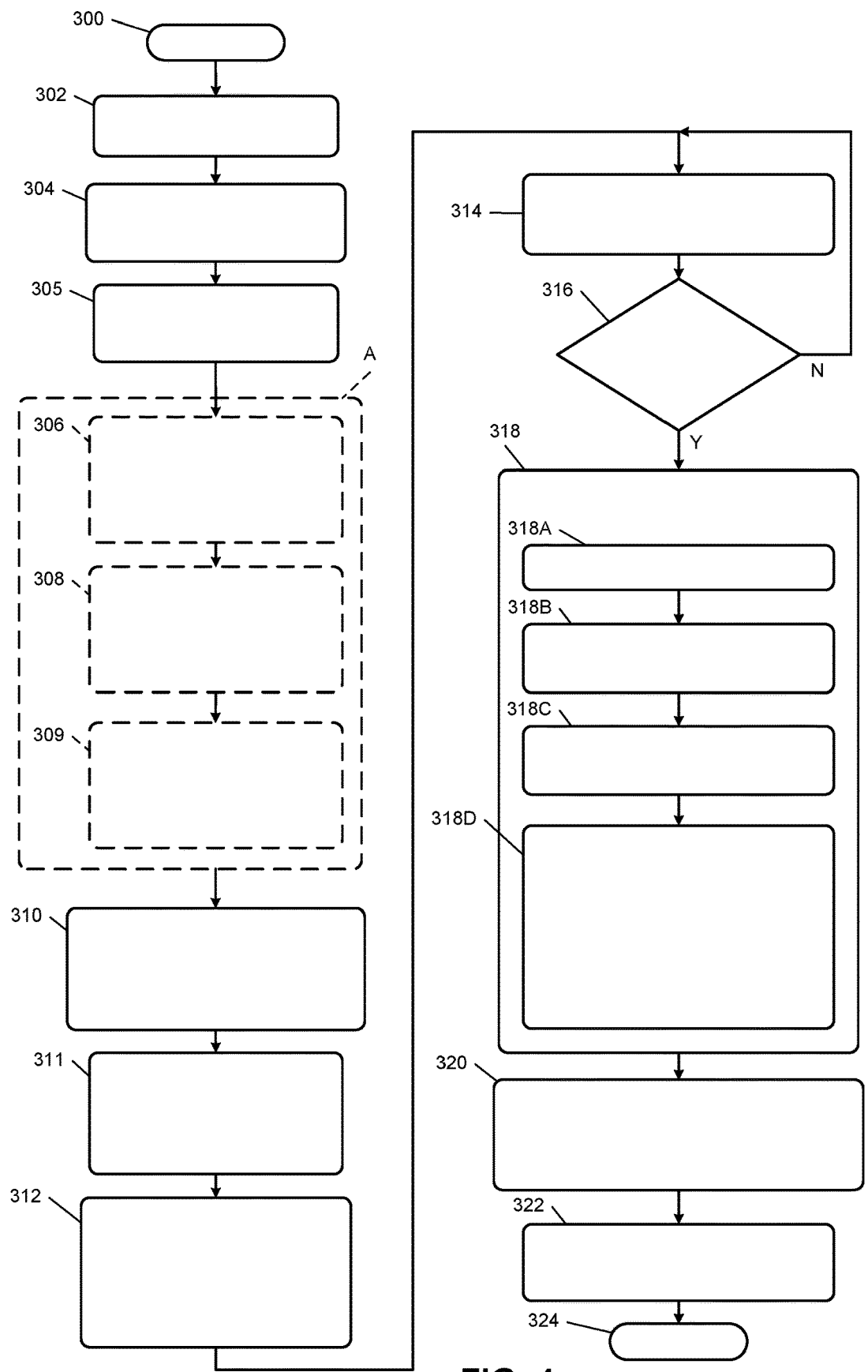
FIG. 4 illustrates an operational method of a control module supplier facility including a method of operating security processor chips and a method of operating a supplier network device in accordance with an embodiment of the present disclosure.
Figure 5:
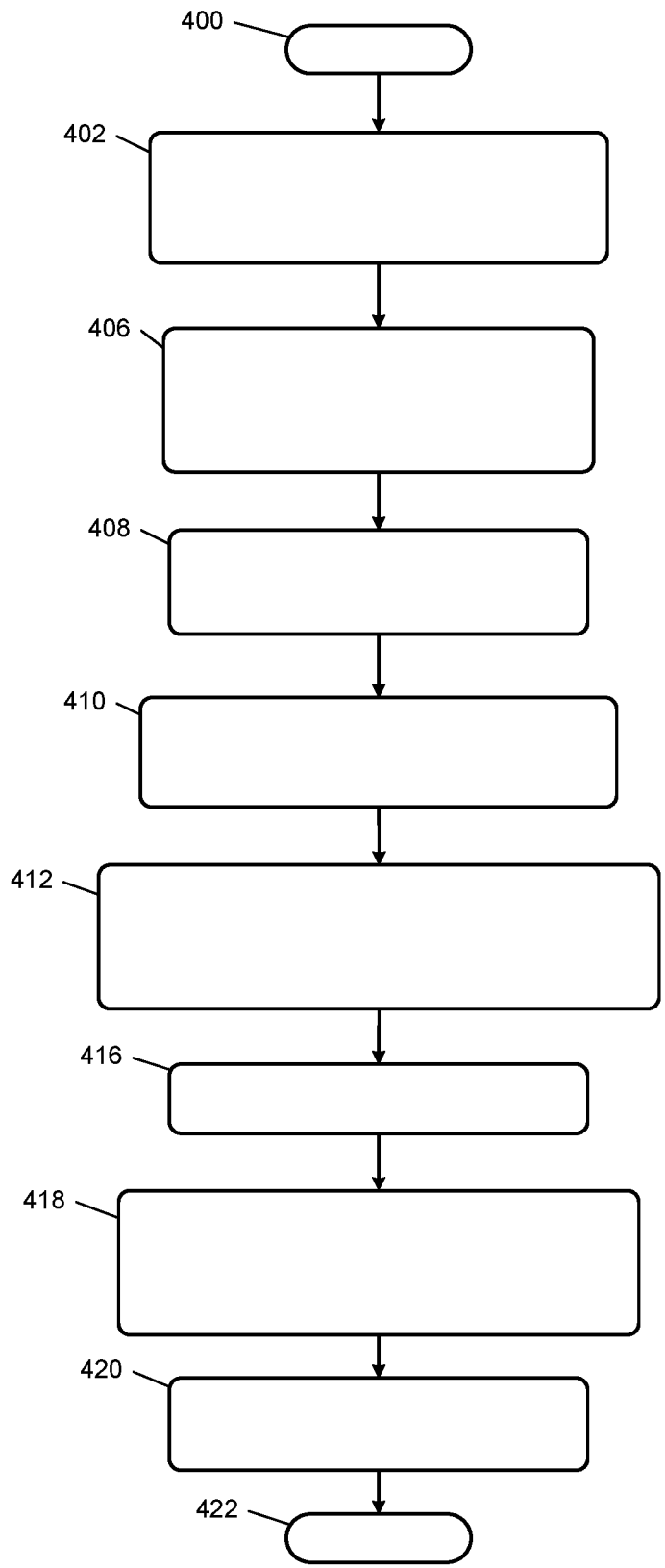
FIG. 5 illustrates a method of operating a certificate authority network device of a vehicle manufacturer data center in accordance with an embodiment of the present disclosure.

The systems disclosed herein may be operated using numerous methods, example methods are illustrated in FIGS. 4-5. FIG. 4 shows an operational method of a control module supplier facility including a method of operating security processor chips and a method of operating a supplier network device. FIG. 5 shows a method of operating a certificate authority network device of a vehicle manufacturer data center. Although the following methods are shown as separate methods, the methods and/or operations from separate methods may be combined and performed as a single method. Also, the method of FIG. 5 may be performed while the method of FIG. 4 is performed.

Although the following operations are primarily described with respect to the implementations of FIGS. 1-4, the operations may be easily modified to apply to other implementations of the present disclosure. The operations may be iteratively performed. The method of FIG. 4 may begin at 300. At 302, the control module supplier facility 14 receives and inventories security processor chips (e.g., the security processor chips 20, 106, 210 of FIGS. 1-3). At 304, one or more of the security processor chips are connected to the key extraction interface 104. At 305, the supplier processor 112, the key extraction interface 104 and/or other device powers on the one or more security processor chips.

The following operations 306, 308, 309 illustrate the example method of operating the security processor chips. This is indicated by dashed box A. At 306, each of the security processor chips generates an ID private/public key pair and a predetermined number (e.g., 3000) or group of signature private/public key pairs. The ID private/public key pair is used for identifying the group of signature private/public key pairs and for identifying the corresponding security processor chip. The ID public key is used for identifying the group of signature public keys for that security processor chip.

At 308, the ID and signature private/public pairs are stored in the security processor chips. The private keys are not transmitted from the security processor chips. The security processor chips are preprogrammed to prevent transmission and/or external access to the private keys. In an embodiment, the security processor chips are the only devices that have access to the private keys.

At 309, the security processor chips transmit the ID and signature public keys to the supplier processor 112 of the supplier network device 102. This may be done via the key extraction interface 104. The supplier processor 112 may extract the public keys from the security processor chips. At 310, the supplier processor 112 receives the ID and signature public keys and stores, for each of the security processor chips, the ID public key and signature public keys in the supplier memory 110.

At 311, the supplier processor 112 transmits the ID and signature public keys to the certificate authority processor 144 via, for example, the supplier transceiver 114. At 312, the one or more security processing chips are disconnected from the programming interface 104 and inventoried as security processor chips that have created private/public key pairs. The security processor chips are inventoried differently than when first received from the security processor chip supplier facility 12 at the control module supplier facility 14.

At 314, the supplier processor 112 receives via the supplier transceiver credential package(s). Each credential package is identified by the corresponding ID public key. The credential package(s) are received from the certificate authority processor 144. At 316, the supplier processor 112 determines whether a number of credential packages received is greater than or equal to a predetermined number. The predetermined number may be a number needed to perform a production run of vehicle control modules. If the number of credential packages received is greater than or equal to the predetermined number, then operation 318 is performed, otherwise operation 314 may be performed.

At 318, the control module supplier facility manufactures a predetermined number of vehicle control modules. At 318A, the security processor chips, memories, transceivers, and/or other devices may be installed on circuit boards to create the vehicle control modules. For each of the vehicle control modules: the ID public key is read from the corresponding security processor chip, as represented by operation 318B; the software package (or credential package) that corresponds to the security processor chip is identified based on the ID public key, as represented by operation 318C; and a corresponding one of the credential packages is programmed into the vehicle control module, as represented by operation at 318D. Operation 318D may also include: the security processor chip of the vehicle control module decrypting an encrypted file of the corresponding received credential package. The credential package is decrypted with the private key corresponding to the ID public key of that security processor chip and stored in the memory of the vehicle control module.

At 320, the supplier processor 112 may transmit, for each of the vehicle control modules manufactured, a hardware ID along with the ID public key of the security processor to the certificate authority processor 144. The hardware ID may be a serial number of the vehicle control module. This allows the security processor chip to be associated to its vehicle control module. The certificate authority processor 144 may store the serial numbers and IDs in the certificate authority memory 146. The serial numbers and IDs may be used by the vehicle manufacturer, the vehicle manufacturer data center 16, a dealer of the vehicle manufacturer, and/or other entity and/or network device of the vehicle manufacturer at a later date when identifying, communicating with, locating and/or troubleshooting the vehicle control modules and/or their security processor chips. At 322, the vehicle control modules are shipped to the vehicle manufacturer plant 18 for installation into corresponding vehicles. The method may end at 324 subsequent to performing operation 322.

The method of FIG. 5 may begin at 400. At 402, the certificate authority processor 144 receives the ID and signature public keys from the supplier processor. This operation may be performed after operation 311 of FIG. 3.

At 406, the certificate authority processor 144 creates certificates for each of the signature public keys received. The certificates contain the information used by other vehicles to verify the authenticity of messages signed by the vehicle control module, including the module public key corresponding to the module private key used to sign the messages. At 408, the certificate authority processor 144 signs each certificate with the vehicle manufacturer root private key and adds this signature to the certificate.

At 410, the certificate authority processor 144 packages the signing certificates for each of the one or more security processor chips into files respectively for vehicle control modules. At 412, the certificate authority processor 144 encrypts the files with the corresponding ID public keys to provide credential packages. Each file is encrypted with the ID public key of the security processor chip corresponding to that file. This encryption is performed to prevent third parties from knowing all the certificates that belong to a specific vehicle, which might enable the third parties to identify the vehicle using the certificate included in broadcast messages of the vehicle.

At 416, the certificate authority processor 144 transmits the credential packages via the certificate authority transceiver 142 back to the supplier processor 112. At 418, the certificate authority processor 144 may receive serial numbers of vehicle control modules and the ID public keys of the corresponding security processor chips.

At 420, the certificate authority processor 144 stores the serial numbers and IDs in the certificate authority memory 146. The method may end at 422 subsequent to performing operation 420.

The above-described operations of FIGS. 4-5 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples provide a secure, robust, efficient processing system for provisioning control modules with security credentials in such a manner that computer and/or network time of use does not interrupt vehicle and/or control module production. The examples allow for security credentials to be created months in advance without expensive inventory of parts being held to receive the security credentials. Private keys are generated in security processor chips and are not removed from the security processor chips. Thus private keys are not exchanged between a control module supplier (or manufacturer) and a vehicle manufacturer. Only public keys and public certificates are exchanged.

Since the credential packages created at the vehicle manufacturer data center are not usable in security processors other than the security processors that have the corresponding private keys, the credential packages do not require special handling and/or protection. In other words, should an attacker obtain access to the credential packages, the attacker would be unable to obtain access to, control, and/or override operations of a vehicle control module without having the corresponding private keys.

The control module and vehicle manufacturing processes are protected against computer downtime that occurs while programming security processor chips. Since control module manufacturing does not start until all credentials are available for the control module, there are not process or response time sensitive IT interactions that can interrupt a control module manufacturing process. The vehicle control modules are shipped to a vehicle manufacturer facility fully provisioned and do not need to be programmed at the vehicle manufacturer facility (or assembly plant).

The above-described methods allow the control module supplier to keep an inventory of security processor chips while credential packages are being created. The control module supplier does not need to maintain an inventory of vehicle control modules. The low amount of inventory by volume and relatively small expense to inventory security processor chips makes it economical to produce multiple month buffers worth of credential packages. This assures that long term computer availability to generate and download credential packages does not cause interruptions to control module manufacturing and/or vehicle assembly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A supplier network device comprising:
   a supplier processor; and
   a memory configured to store instructions executable by the supplier processor and credential packages, wherein one of the credential packages includes credential information for at least one of a first security processor chip or a corresponding vehicle control module to perform predetermined functions within a vehicle,
   wherein the supplier processor is configured to execute the instructions to
      receive an identifier (ID) public key and a plurality of signature public keys from the first security processor chip, wherein the ID public key and the plurality of signature public keys correspond to respective private keys stored in the first security processor chip,
      transmit the ID public key and the plurality of signature public keys to a certificate authority processor of a vehicle manufacturer data center,
      receive the one of the credential packages from the certificate authority processor prior to assembly of the vehicle control module, wherein the credential package includes a plurality of signing certificates,
      read the ID public key from the vehicle control module subsequent to incorporating the first security processor chip in the vehicle control module,
      identify the one of the credential packages based on the ID public key, and
      based on the identifying of the one of the credential packages, program the vehicle control module with the plurality of signing certificates prior to installation of the vehicle control module in the vehicle.

2. The supplier network device of claim 1, wherein the supplier processor is configured to execute the instructions to:
   transmit an ID public key and a plurality of signature public keys for each of a plurality of security processor chips;
   the plurality of security processor chips include the first security processor chip; and
   in response to transmitting the transmit ID public key and the plurality of signature public keys for each of the plurality of security processor chips, receive the credential packages from the certificate authority processor.

3. The supplier network device of claim 2, wherein the supplier processor is configured to execute the instructions to:
wait until a predetermined number of credential packages are received; and
when the predetermined number of credential packages have been received from the certificate authority processor, programming a plurality of vehicle control modules.

4. The supplier network device of claim 3, wherein the plurality of vehicle control modules are programmed to perform vehicle-to-vehicle communication functions.

5. The supplier network device of claim 1, wherein the supplier processor does not receive the private keys from the first security processor chip.

6. The supplier network device of claim 1, wherein the supplier processor is configured to execute the instructions to, subsequent to receiving the one of the credential packages from the certificate authority processor to the supplier processor, transmit a serial number of the vehicle control module and the ID public key from the supplier processor to the certificate authority processor.

7. A security credential programming system comprising:
the supplier network device of claim 1;
the first security processor chip is configured to prevent external access to the private keys; and
a key extraction interface connecting the supplier network device to the first security processor chip.

8. The security credential programming system of claim 7, wherein the first security processor chip is configured to, prior to being incorporated in the vehicle control module, (i) generate the ID public key and the plurality of signature public keys, and (ii) transmit the ID public key and the plurality of signature public keys to the supplier processor.

9. The security credential programming system of claim 7, wherein:
the first security processor chip generates the private keys while generating the ID public key and the signature public keys; and
one of the private keys corresponds to the ID public key and the other ones of the private keys correspond respectively to the signature public keys.

10. The security credential programming system of claim 9, wherein:
the credential packages are encrypted based on the ID public key; and
the first security processor chip is configured to, subsequent to being incorporated in the vehicle control module, decrypt the one of the credential packages based on a private key corresponding to the ID public key.

11. A certificate authority network device comprising:
a certificate authority processor; and
a memory configured to store instructions executable by the certificate authority processor,
wherein the certificate authority processor is configured to execute the instructions to
receive an identifier (ID) public key and a plurality of signature public keys from a supplier processor of a control module supplier facility, wherein the ID public key and the plurality of signature public keys correspond to respective private keys stored in a first security processor chip,
create certificates respectively for the plurality of signature public keys,
sign the certificates with a vehicle manufacturer root private key to provide a plurality of signing certificates,
package the plurality of signing certificates into a file to create a first credential package, wherein the first credential package includes credential information for at least one of the first security processor chip or a corresponding vehicle control module to perform predetermined functions within a vehicle, and
prior to the control module supplier facility manufacturing the vehicle control module including the first security processor chip, transmit the first credential package from the certificate authority network device to the supplier processor for programming the security processor chip.

12. The certificate authority network device of claim 11, wherein the certificate authority processor is configured to execute the instructions to encrypt the file including the plurality of signing certificates based on the ID public key to provide the first credential package.

13. The certificate authority network device of claim 11, wherein the certificate authority processor is configured to execute the instructions to:
receive an ID public key and a plurality of signature public keys from the supplier processor for a plurality of security processor chips, wherein the plurality of security processor chips includes the first security processor chip,
for each of the plurality of security processor chips,
create certificates respectively for the corresponding plurality of signature public keys,
sign the corresponding ones of the certificates with the vehicle manufacturer root private key to provide a plurality of signing certificates, and
package the corresponding plurality of signing certificates into a file to provide a respective one of a plurality of credential packages, wherein the plurality of credential packages include the first credential package, and
prior to the control module supplier facility manufacturing a plurality of vehicle control modules including the plurality of security processor chips, transmit the plurality of credential packages of the plurality of security processor chips from the certificate authority network device to the supplier processor for programming the plurality of security processor chips.

14. The certificate authority network device of claim 13, wherein the certificate authority processor is configured to execute the instructions to (i) encrypt the files based respectively on the ID public keys to provide the plurality of credential packages, and (ii) transmit the plurality of credential packages to the supplier processor.

15. The certificate authority network device of claim 11, wherein the certificate authority processor is configured to execute the instructions to (i) subsequent to transmitting the file from the certificate authority network device to the supplier processor, receive a serial number of the vehicle control module from the supplier processor; and (ii) store the serial number of the vehicle control module along with the ID public key.

16. A security credential programming system comprising:
a first network device comprising
a first memory configured to store credential packages, wherein the credential package includes credential information for a first security processor chip to perform predetermined functions within a vehicle; and a first processor configured to
receive an identifier (ID) public key and a plurality of signature public keys from the first security processor chip, wherein the ID public key and the plurality of signature public keys correspond to respective private keys stored in the first security processor chip, and
transmit the ID public key and the plurality of signature public keys; and a second network device comprising
a second memory; and
a second processor configured to
receive the ID public key and the plurality of signature public keys from the first processor,
create certificates respectively for the plurality of signature public keys,
sign the certificates with a vehicle manufacturer root private key to provide a plurality of signing certificates,
package the plurality of signing certificates and creating one of the credential packages, and
prior to the manufacturing a vehicle control module including the first security processor chip, transmit the one of the credential packages from the second network device to the first processor for programming a first vehicle control module, wherein the first processor is configured to
receive the one of the credential packages from the second processor prior to assembly of the first vehicle control module,
read the ID public key from the first vehicle control module subsequent to incorporating the first security processor chip in the first vehicle control module,
identify the one of the credential packages based on the ID public key, and
based on the identifying of the one of the credential packages, program the first vehicle control module with the plurality of signing certificates prior to installation of the first vehicle control module in the vehicle.

17. The security credential programming system of claim 16, wherein the first processor is configured to:
wait until a predetermined number of credential packages are received from the second processor; and
when the predetermined number of credential packages have been received from the second processor, programming a plurality of vehicle control modules including the first vehicle control module.

* * * * *